(12) United States Patent
Delaporte

(10) Patent No.: US 11,893,177 B2
(45) Date of Patent: Feb. 6, 2024

(54) FLEXIBLE DISPLAY DEVICE HAPTICS

(71) Applicant: Lepton Computing LLC, Brooklyn, NY (US)

(72) Inventor: Stephen E. Delaporte, Brooklyn, NY (US)

(73) Assignee: LEPTON COMPUTING LLC, Brooklyn, NY (US)

( * ) Notice: Subject to any disclaimer, the term of this patent is extended or adjusted under 35 U.S.C. 154(b) by 0 days.

(21) Appl. No.: 17/521,854

(22) Filed: Nov. 8, 2021

(65) Prior Publication Data

US 2022/0197427 A1 Jun. 23, 2022

Related U.S. Application Data

(60) Provisional application No. 63/111,049, filed on Nov. 8, 2020.

(51) Int. Cl.
| | |
|---|---|
| *G06F 3/041* | (2006.01) |
| *G06F 3/01* | (2006.01) |
| *G06F 3/0346* | (2013.01) |
| *G06F 1/16* | (2006.01) |

(52) U.S. Cl.
CPC .......... *G06F 3/0416* (2013.01); *G06F 1/1652* (2013.01); *G06F 3/016* (2013.01); *G06F 3/0346* (2013.01); *G06F 3/041* (2013.01); *G06F 3/0412* (2013.01); *G06F 2203/04102* (2013.01)

(58) Field of Classification Search
CPC ...... G06F 3/016; G06F 3/0412; G06F 3/0416; G06F 1/1652; G06F 2203/04102
See application file for complete search history.

(56) References Cited

U.S. PATENT DOCUMENTS

| | | |
|---|---|---|
| 5,850,206 A | 12/1998 | Kashiwagi |
| 8,816,977 B2 | 8/2014 | Rothkopf et al. |
| 9,173,288 B1 | 10/2015 | Kim |
| 9,799,279 B1 * | 10/2017 | Evans, V .............. G09G 3/035 |
| 2008/0238879 A1 | 10/2008 | Jaeger et al. |
| 2009/0131117 A1 | 5/2009 | Choi |
| 2012/0235935 A1 * | 9/2012 | Ciesla .................... G06F 3/047 |
| | | 345/173 |
| 2013/0321340 A1 | 12/2013 | Seo et al. |

(Continued)

*Primary Examiner* — Ryan A Lubit
(74) *Attorney, Agent, or Firm* — Burns & Levinson, LLP; Joseph M. Maraia

(57) ABSTRACT

A touch screen display device with a flexible display that also includes an embedded haptic drive system. The device may be made up of one continuous flexible display that does not fold, or of multiple display segments which can be folded from a compact state that is roughly the size of a typical handheld phone or smaller, to an expanded state that is roughly the size of a larger phone or tablet computer. The haptic drive system is located underneath the flexible display and can physically alter its surface geometry by partially flexing the display at single or multiple points. The device may further include sensors to indicate the state of configuration and mechanisms for alignment, locking, and further structural support. In one embodiment, a module attached to, situated within, or otherwise associated with at least one segment of the flexible display may contain all or substantially all processing and memory, along with a communications system, which may be used in any folded state.

18 Claims, 3 Drawing Sheets

(56) References Cited

U.S. PATENT DOCUMENTS

| | | | |
|---|---|---|---|
| 2019/0020760 A1* | 1/2019 | DeBates | H04M 3/493 |
| 2019/0042066 A1 | 2/2019 | Kim et al. | |
| 2020/0042273 A1 | 2/2020 | Dong et al. | |
| 2020/0097086 A1* | 3/2020 | Bushnell | H10N 30/20 |
| 2020/0293093 A1* | 9/2020 | Kim | G06F 1/1681 |
| 2021/0096732 A1 | 4/2021 | Sonnino et al. | |
| 2021/0096742 A1 | 4/2021 | Yoon et al. | |

* cited by examiner

FLEXIBLE DISPLAY DEVICE HAPTICS

CROSS REFERENCE TO RELATED APPLICATIONS

This application claims the benefit of U.S. Provisional Patent Application No. 63/111,042, filed on Nov. 8, 2020, which is incorporated in its entirety herein by reference.

FIELD OF THE INVENTION

The present invention relates generally to computing devices, and more particularly, to a computing device that integrates a flexible touch screen display.

BACKGROUND OF THE INVENTION

The use of handheld computing devices today has been significantly enabled by a number of advancements in electronics, including the miniaturization of components, an increase in processing speeds, improved memory capacity, and the optimization of battery efficiency. Advancements in touch screen display technology have also enabled interfaces to become more adaptable and intuitive to use on a small scale. Because of these enormous improvements over the last decade, the differences in the performance between handheld computing devices, such as mobile phones, and larger computing devices, have become increasingly subtle.

One of the great difficulties in using a small-scale touch screen device, however, is in the fact that it can often be cumbersome to physically interact with. This is especially apparent when selecting and manipulating features and inputting text, which can sometimes be imprecise for a user. In such handheld computing devices as a touch screen mobile phone, the limited size of the display can also significantly reduce the viewing capacity while watching videos, using graphic intensive applications, and reading text. The rigid nature of a standard touch screen display can also limit the portability of a device when its form factor is in the larger size range for a phone, or at the scale of a tablet, which makes folding a desirable feature. Additionally, because of the physical malleability of a flexible display, other functions beyond the actual folding of the device's display are not utilized to their full capacity.

There is therefore a need for touch screen display devices that can be adjusted in size without sacrificing the convenience of being small and handheld. There is also a need for a haptic drive system that can take advantage the inherent physical malleability of a flexible display to enhance interface functions whether the device is foldable or not.

SUMMARY OF EMBODIMENTS OF THE INVENTION

A touch screen display device with a continuous flexible display that either does not fold or is made up of segments that can be folded from a compact state to an expanded state which also includes a haptic drive system. The form factor of the foldable compact state is roughly the size of a typical handheld phone or smaller. The form factor of the foldable expanded state is roughly the size of a larger phone or tablet computer, which may also include the mechanical functionality of a laptop. Both states may include an integrated speaker and microphone. The haptic drive system is located underneath the flexible display and can physically alter its surface geometry by partially flexing the display at single or multiple points. The device may further include sensors to indicate the state of configuration and mechanisms for alignment, locking, and further structural support. In one embodiment, a module attached to, situated within, or otherwise associated with at least one segment of the flexible display or rigid display may contain all or substantially all processing and memory, along with a communications system, which may be used in any state.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

Figure 1:
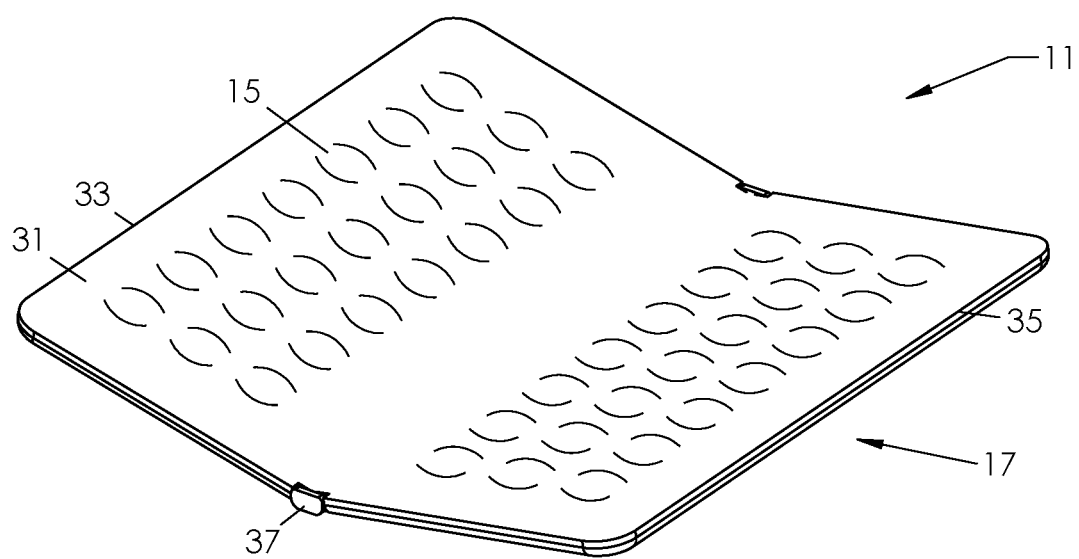
FIG. 1 is a flexible display device with an array of haptic drive mechanisms situated underneath the display shown partially flexing the display surface at different points.
Figure 1:
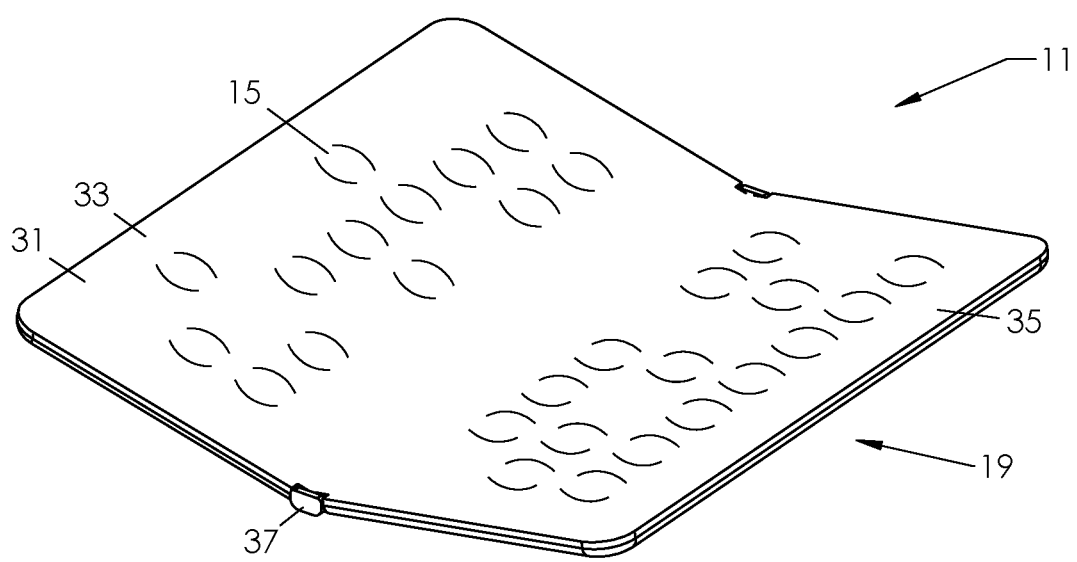

In accordance with the exemplary embodiment shown in FIG. 1. a flexible display device 11 is shown with an array of haptic drive mechanisms situated underneath flexible display 31 where multiple haptic drive points 15 are flexing the display surface at different points 33 and 35 via unit 37. In the upper flexible display device embodiment 17, the device is shown with all haptic drives actuated in a grid, while in the lower flexible display device embodiment 19, the device is shown to illustrate how variable points can be actuated in different patterns. The primary function of this interface is to enhance a user's interaction with the device. For example, when interacting with the touch screen, when a single or multiple haptic drive points 15 are activated, the physical feedback to the user can emphasize the importance of a point of interest on the display, whether is be to mimic the topography of a map, or to enhance a gaming experience, along with several other kinds of applications. For visually impaired users, this haptic feature can also help enhance their ability to better understand what is being shown on the display.

Figure 2:
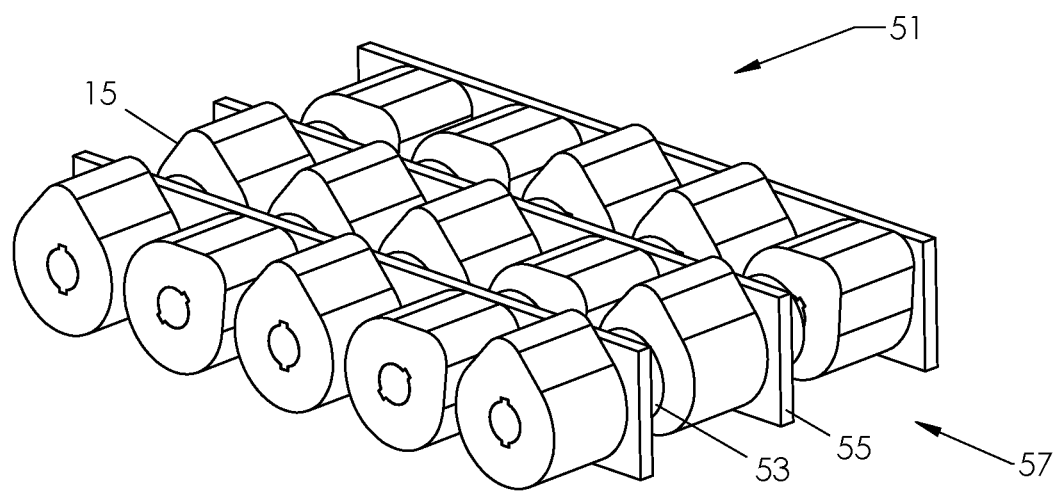
FIG. 2 is a perspective view of an array of haptic drive mechanisms that sit underneath a flexible display within a device.

FIG. 2 is a perspective view of an array of haptic drive mechanisms 51 that sit underneath a flexible display within a device where a row of cam mechanisms 57 can be seen rotated into different positions to create different protrusion offsets along the surface of the flexible display that they sit below. The row of cam mechanisms 57 rests along a structural support 55. Each haptic drive point 15 within the haptic drive mechanism array 51 can be rotated by a small actuator 53 that is coupled directly to each cam mechanism which can also include an encoder to determine the exact point of rotation and off set of the protrusion. These same actuators can also be used to detect force against the flexible display. It should also be notes that with a linear drive mechanism, the force against the flexible display can also be pulled such that the flexible display is pulled inward away from its suffice plane, or retained along the surface plane when adjacent cams are being actuated upward. This can be achieved when the linear or rotational cam mechanism is affixed to the flexible display. With a rotational cam, a slot can be integrated along the edge of the cam such that it engages with a pin or hook located on the underside of the flexible display, thus allowing the haptic mechanism to retain the flat position of the display, or pull it inward to enhance the 3D surface geometry of the display.

Figure 3:
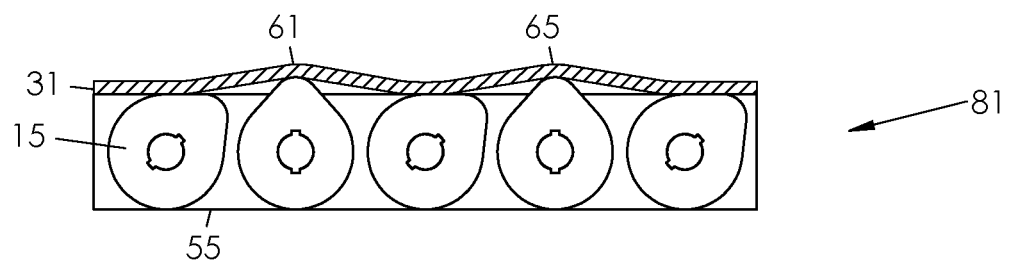
FIG. 3 is a sectional view of the haptic drive mechanisms array shown with cams activated at different points.
Figure 3:
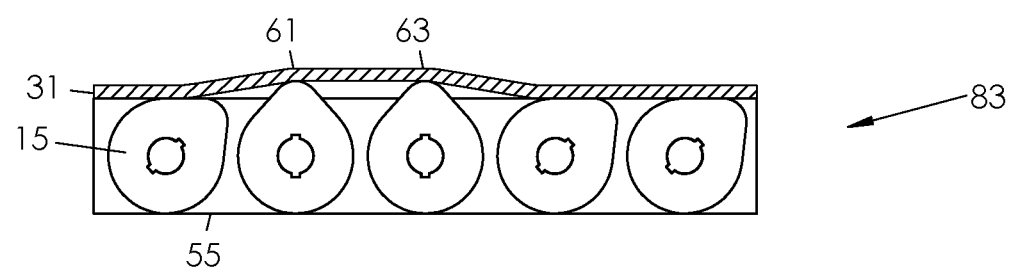
Figure 3:
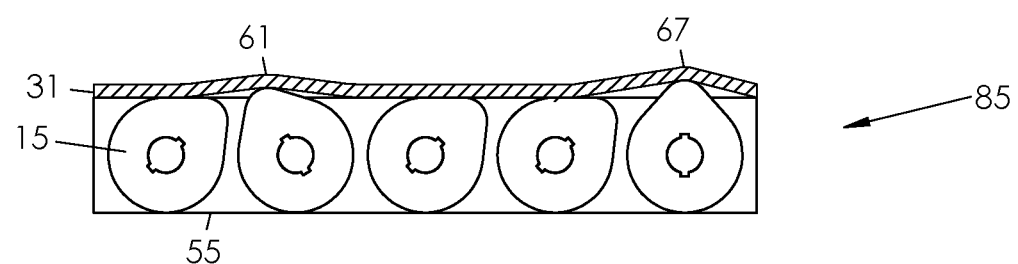

FIG. 3 is a sectional view of the haptic drive mechanisms array shown with cams activated at different points. 'The upper configuration 81 shows two haptic drive points 15 which correspond to protrusions 61 and 65 that are shown isolated from each other. In the middle embodiment 83, two haptic drive points 15 which correspond to protrusions 61 and 63 are shown creating a single larger protrusion along the surface of flexible display 31. In the lower embodiment 85, the two haptic drive points 15 are shown to protrusions 61 and 67. Protrusion 61 is shown with the cam of its haptic drive point 15 partially rotated to present a more subtle protrusion offset as compared with protrusion 67 which has a fully protruded offset as the cam is rotated with its highest point facing upward. It is important to consider that each haptic drive point 15 can be actuated through other means, such as with a rack and pinion or a miniature and other forms of actuation to change the surface geometry of the flexible display that the sits above the haptic drive points.

What is claimed is:

1. An apparatus comprising:
   (a) a flexible touch-sensitive display composed of a first flexible touch-sensitive display portion and a second flexible touch-sensitive display portion; wherein:
      (1) the first flexible touch-sensitive display portion is attached to a first structural support segment;
      (2) the second flexible touch-sensitive display portion is attached to a second structural support segment:
      (3) the flexible touch-sensitive display further comprises having a fully folded state;
      (4) the flexible touch-sensitive display further comprises having a partially expanded state;
      (5) the flexible touch-sensitive display further comprises having a fully expanded state;
   (b) an array of adjacent haptic elements mounted to and cantilevered from a flat rectilinear plate structure that spans across the width and height of at least one of the structural support segments which is held within the structural support segment and situated directly underneath the flexible touch-sensitive display, whereby the flat rectilinear plate structure and a plurality of adjacent flat rectilinear plate structures are affixed to the underside of the flexible touch-sensitive display such that the haptic elements can be moved through rotary motions where the individual center axes of each of the rotary motions are situated perpendicular to the length of the flat rectilinear plate structure to physically flex the surface of the flexible touch-sensitive display.

2. The apparatus of claim 1 wherein:
the haptic element is driven by an actuator.

3. The apparatus of claim 2 wherein:
the haptic element is driven by an actuator to rotate.

4. The apparatus of claim 2 wherein:
the haptic element is driven by an actuator to move vertically along a linear path.

5. The apparatus of claim 1 wherein:
the haptic element is affixed to the flexible touch-sensitive display such that it can pull the flexible display inward away from its linear surface plane or retain the flexible display along its linear surface plane as an adjacent haptic element forces the flexible touch-sensitive display away from its linear surface plane at a separate point.

6. The apparatus of claim 1 wherein:
the haptic element is actuated to move in accordance with input from a user through their interaction with the touch screen of the flexible touch-sensitive display.

7. The apparatus of claim 1 wherein:
the haptic element is actuated to move in accordance with input from a user through their interaction with the touch screen and the graphical user interface elements shown on the flexible touch-sensitive display.

8. The apparatus of claim 1 wherein:
the haptic element is used to sense force input from a user through their interaction with the surface of the flexible touch-sensitive display.

9. The apparatus of claim 1 wherein:
the haptic element is actuated at a single point or in an array with multiple haptic elements to correspond with a graphic shown on the flexible touch-sensitive display.

10. An apparatus comprising:
a flexible touch-sensitive display attached to a structural support housing;
an array of adjacent haptic elements mounted to and cantilevered from a flat rectilinear plate structure that spans across the width and height of at least one of the structural support segments which is held within the structural support segment and situated directly underneath the flexible touch-sensitive display, whereby the flat rectilinear plate structure and a plurality of adjacent flat rectilinear plate structures arc affixed to the underside of the flexible touch-sensitive display such that the haptic elements can be moved through rotary motions where the individual center axes of each of the rotary motions are situated perpendicular to the length of the flat rectilinear plate structure to physically flex the surface of the flexible touch-sensitive display.

11. The apparatus of claim 10 wherein:
the haptic clement is driven by an actuator.
12. The apparatus of claim 11 wherein:
the haptic element is driven by an actuator to rotate.
13. The apparatus of claim 11 wherein:
the haptic element is driven by an actuator to move vertically along a linear path.
14. The apparatus of claim 10 wherein:
the haptic element is affixed to the flexible touch-sensitive display such that it can pull the flexible display imvard. away from its linear surface plane or retain the flexible display along its linear surface plane as an adjacent haptic element forces the flexible touch-sensitive display away from its linear surface plane at a separate point.
15. The apparatus of claim 10 wherein:
the haptic element is actuated to move in accordance with input from a. user through their interaction with the touch screen of the flexible touch-sensitive display.
16. The apparatus of claim 10 wherein:
the haptic element is actuated to move in accordance with input from a user through their interaction with the touch screen and the graphical user interface elements shown on the flexible touch-sensitive display.
17. The apparatus of claim 1 wherein:
the haptic element is used to sense force input from a user through their interaction with the surface of the flexible touch-sensitive display.
18. The apparatus of claim 10 wherein:
the haptic element is actuated at a single point or in an array with multiple haptic elements to correspond with a graphic shown on the flexible touch-sensitive display.

\* \* \* \* \*